(12) United States Patent
Moreno (10) Patent No.: US 9,968,874 B2
(45) Date of Patent: May 15, 2018

(54) FLUID PUMP WITH A STRAINER

(71) Applicant: DELPHI TECHNOLOGIES IP LIMITED, St. Michael (BB)

(72) Inventor: Alejandro Moreno, El Paso, TX (US)

(73) Assignee: DELPHI TECHNOLOGIES IP LIMITED, St. Michael (BB)

( * ) Notice: Subject to any disclaimer, the term of this patent is extended or adjusted under 35 U.S.C. 154(b) by 358 days.

(21) Appl. No.: 14/679,197

(22) Filed: Apr. 6, 2015

(65) Prior Publication Data

US 2016/0288028 A1    Oct. 6, 2016

(51) Int. Cl.
| | |
|---|---|
| *B01D 35/26* | (2006.01) |
| *C02F 1/00* | (2006.01) |
| *B01D 35/027* | (2006.01) |
| *F04B 17/00* | (2006.01) |

(52) U.S. Cl.
CPC ......... *B01D 35/26* (2013.01); *B01D 35/0276* (2013.01)

(58) Field of Classification Search
USPC .... 210/172.3, 91, 149, 184, 167.02, 167.04, 210/172, 172.4, 232, 243, 250, 295, 299, 210/335, 416.4, 416.5, 440, 443, 460, 210/461, 486, 808; 417/321, 323, 360, 417/363, 364, 410.1; 123/509, 514
See application file for complete search history.

(56) References Cited

U.S. PATENT DOCUMENTS

| | | | |
|---|---|---|---|
| 4,312,753 A * | 1/1982 | Bell | B01D 35/0273 210/250 |
| 6,361,691 B1 | 3/2002 | Dockery et al. | |
| 6,517,327 B2 | 2/2003 | Beyer et al. | |
| 6,833,070 B2 | 12/2004 | Fischer et al. | |
| 6,878,275 B2 | 4/2005 | Yamada | |
| 7,757,672 B2 | 7/2010 | Villaire et al. | |
| 8,460,542 B2 | 6/2013 | Oku et al. | |
| 8,893,686 B2 | 11/2014 | Yamada et al. | |
| 2006/0183619 A1* | 8/2006 | Stoyell | B01D 29/111 493/430 |
| 2006/0273114 A1* | 12/2006 | Ophardt | A47K 5/14 222/321.1 |
| 2007/0095733 A1* | 5/2007 | Pizzo | B01D 35/0273 210/172.4 |
| 2008/0290013 A1* | 11/2008 | Stausberg | B01D 29/52 210/167.04 |
| 2008/0310976 A1* | 12/2008 | Boutros | F02M 37/08 417/410.1 |
| 2010/0025318 A1* | 2/2010 | Berland | B01D 35/26 210/243 |

(Continued)

Primary Examiner — Hayden Brewster
(74) Attorney, Agent, or Firm — Joshua M. Haines (57) ABSTRACT

A fluid pump includes a pump housing; an inlet which introduces fluid into the pump housing; an outlet which discharges the fluid from the pump housing; a pump section which pumps the fluid from the inlet to the outlet; and a strainer through which the fluid passes in order to enter the inlet. The fluid pump extends along an axis and the strainer includes a straining medium configured to allow the fluid to pass therethrough while preventing foreign matter of a predetermined size from passing therethrough. The straining medium defines a strained volume with the pump housing such that the strained volume is defined radially between the straining medium and the pump housing and such that the strained volume is in fluid communication with the inlet.

18 Claims, 7 Drawing Sheets

(56) References Cited

U.S. PATENT DOCUMENTS

| | | |
|---|---|---|
| 2011/0139278 A1 | 6/2011 | Kawajiri et al. |
| 2011/0259838 A1* | 10/2011 | Bernards .............. B01D 29/232 |
| | | 210/808 |
| 2014/0314591 A1 | 10/2014 | Herrera et al. |
| 2014/0345719 A1 | 11/2014 | Kim et al. |

* cited by examiner

FLUID PUMP WITH A STRAINER

TECHNICAL FIELD OF INVENTION

The present invention relates to a fluid pump; more particularly to a fuel pump; and even more particularly to a fuel pump with a strainer which prevents foreign matter from entering an inlet of the fuel pump.

BACKGROUND OF INVENTION

Fluid pumps, and more particularly fuel pumps for pumping fuel, for example, from a fuel tank of a motor vehicle to an internal combustion engine of the motor vehicle, are known. It is common for the fuel pump to be part of a fuel delivery module which includes a fuel reservoir defining a reserve fuel volume within the fuel tank. The fuel pump is located within the fuel reservoir, thereby ensuring that the fuel pump is exposed to fuel even when the fuel within the fuel tank is low or may shift within the fuel tank due to the motor vehicle operating on an incline or due to the motor vehicle navigating a turn at high speed. Such fuel pumps commonly include a fuel strainer connected to an inlet of the fuel pump in order to prevent foreign matter that may be present in the fuel from entering the fuel pump where the foreign matter may have undesirable consequences on the operation and durability of the fuel pump and other components such as fuel injectors that are downstream of the fuel pump. Examples of fuel pumps with strainers are described in U.S. Pat. No. 7,757,672 to Villaire et al. and U.S. Pat. No. 8,460,542 to Oku et al. The fuel strainer must provide sufficient filtering area in order to accommodate the flow of the fuel pump, however, due to packaging constraints, it is often difficult to provide a fuel strainer with sufficient filtering area in the available space while remaining simple and economical to manufacture. Furthermore, fuel strainers can be susceptible to plugging when diesel fuel is the fuel to be pumped because diesel fuel is subject to gelling or crystallizing at low temperatures. When diesel fuel gels, the fuel strainer may become clogged and the fuel pump becomes starved of fuel, thereby providing an insufficient flow of fuel to the internal combustion engine.

What is needed is a fuel pump and strainer which minimizes or eliminates one or more of the shortcomings as set forth above.

SUMMARY OF THE INVENTION

Briefly described, a fluid pump includes a pump housing; an inlet which introduces fluid into the pump housing; an outlet which discharges the fluid from the pump housing; a pump section which pumps the fluid from the inlet to the outlet; and a strainer through which the fluid passes in order to enter the inlet. The fluid pump extends along an axis and the strainer includes a straining medium configured to allow the fluid to pass therethrough while preventing foreign matter of a predetermined size from passing therethrough. The straining medium defines a strained volume with the pump housing such that the strained volume is defined radially between the straining medium and the housing and such that the strained volume is in fluid communication with the inlet. The strainer provides a compact arrangement with the fluid pump, yet provides a large filtering area that is simple and economical to produce. Furthermore, by defining the strained volume with the pump housing, heat generated by the fluid pump can improve cold temperature operation, for example when diesel fuel is the fluid being pumped.

BRIEF DESCRIPTION OF DRAWINGS

This invention will be further described with reference to the accompanying drawings in which.

DETAILED DESCRIPTION OF INVENTION

Figure 1:
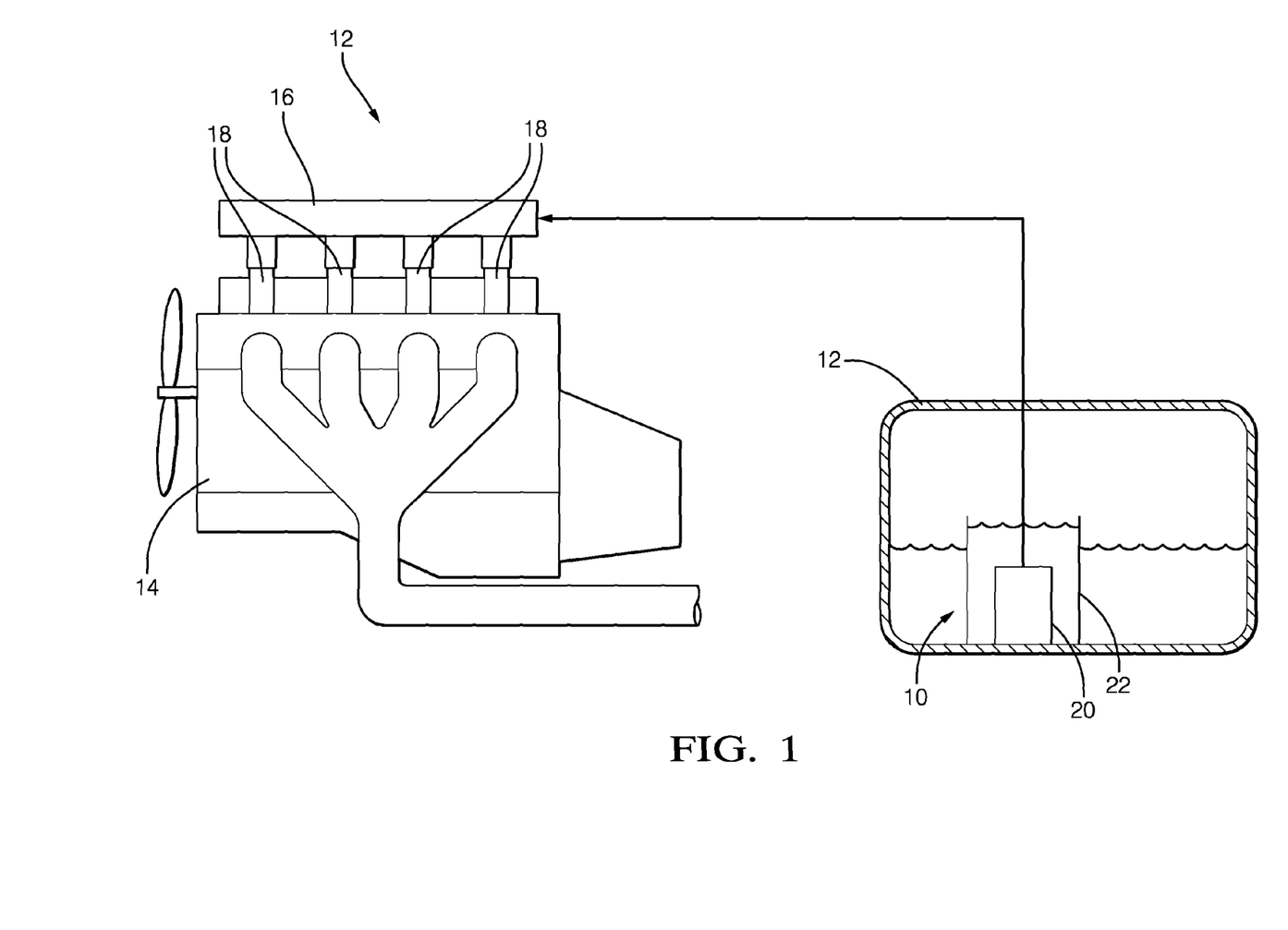
FIG. 1 is a schematic view of a fuel tank and fuel delivery module in accordance with the present invention which supply fuel to an internal combustion engine.

Reference will first be made to FIG. 1 which shows a fluid delivery module, illustrated as fuel delivery module 10, which is used to supply fuel from a fuel tank 12 to a fuel consuming device, illustrated as internal combustion engine 14 for a motor vehicle. Fuel delivery module 10 is located within fuel tank 12 and supplies the fuel to a fuel rail 16 of internal combustion engine 14. A plurality of fuel injectors 18 are in fluid communication with fuel rail 16, thereby receiving fuel from fuel rail 16. Each fuel injector 18 is configured to meter a precise amount of fuel to a respective combustion chamber (not shown) of internal combustion engine 14 where the fuel is combusted in order to provide propulsion to the motor vehicle and drive other accessories, by way of non-limiting example, an air conditioning system, an electrical system, and power steering.

In addition to FIG. 1, reference will now be made to FIG. 2 which is an axial cross-sectional view of fuel delivery module 10. Fuel delivery module 10 generally includes a fluid pump 20, herein after referred to as fuel pump 20, and a reservoir assembly 22. While the fluid delivery module has been illustrated as fuel delivery module 10, it should be understood that the invention is not to be limited to a fuel delivery module, but could also be applied to a fluid delivery module which delivers fluids other than fuel.

Figure 2:
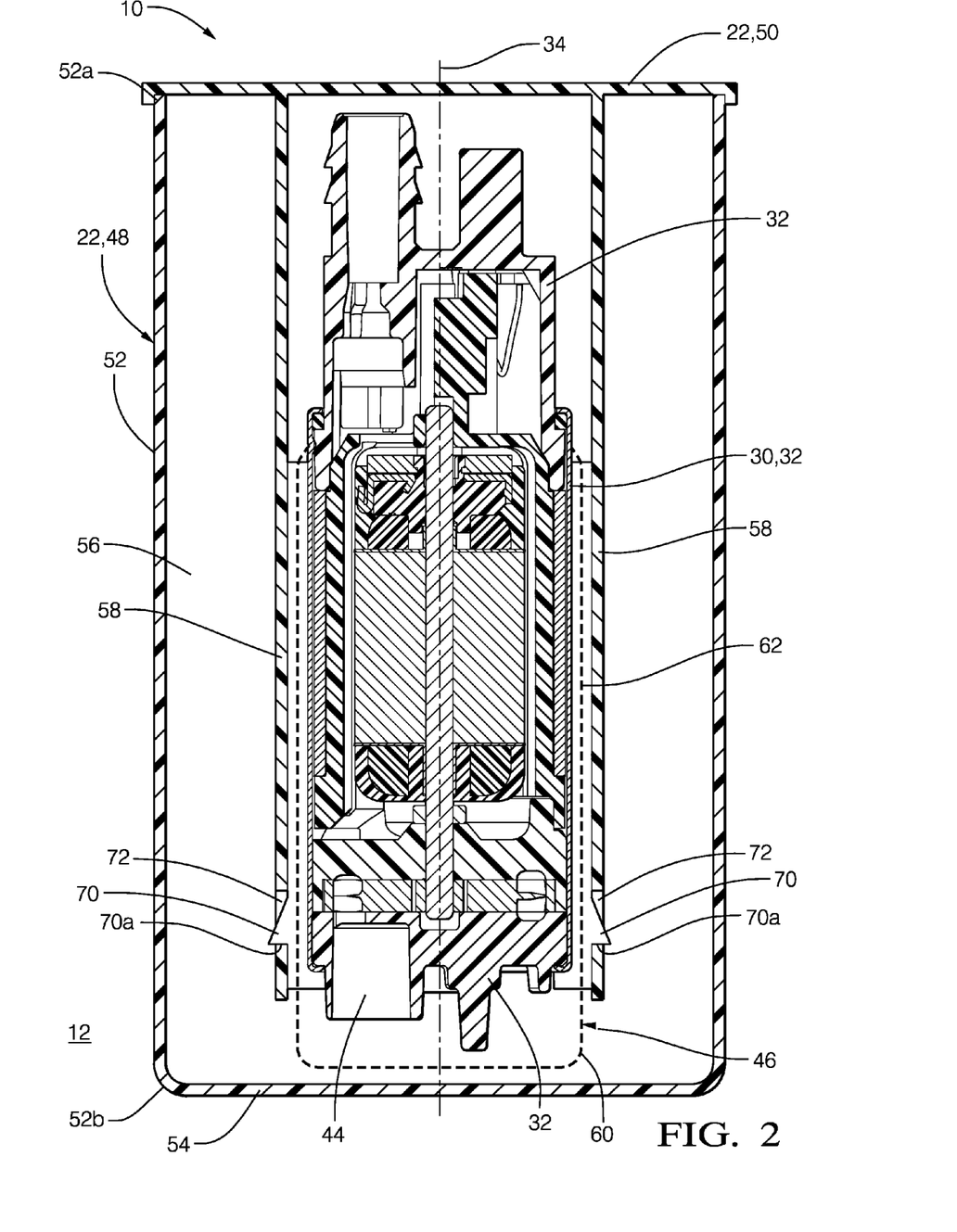
FIG. 2 is an axial cross-sectional view of the fuel delivery in accordance with the present invention.
Figure 3:
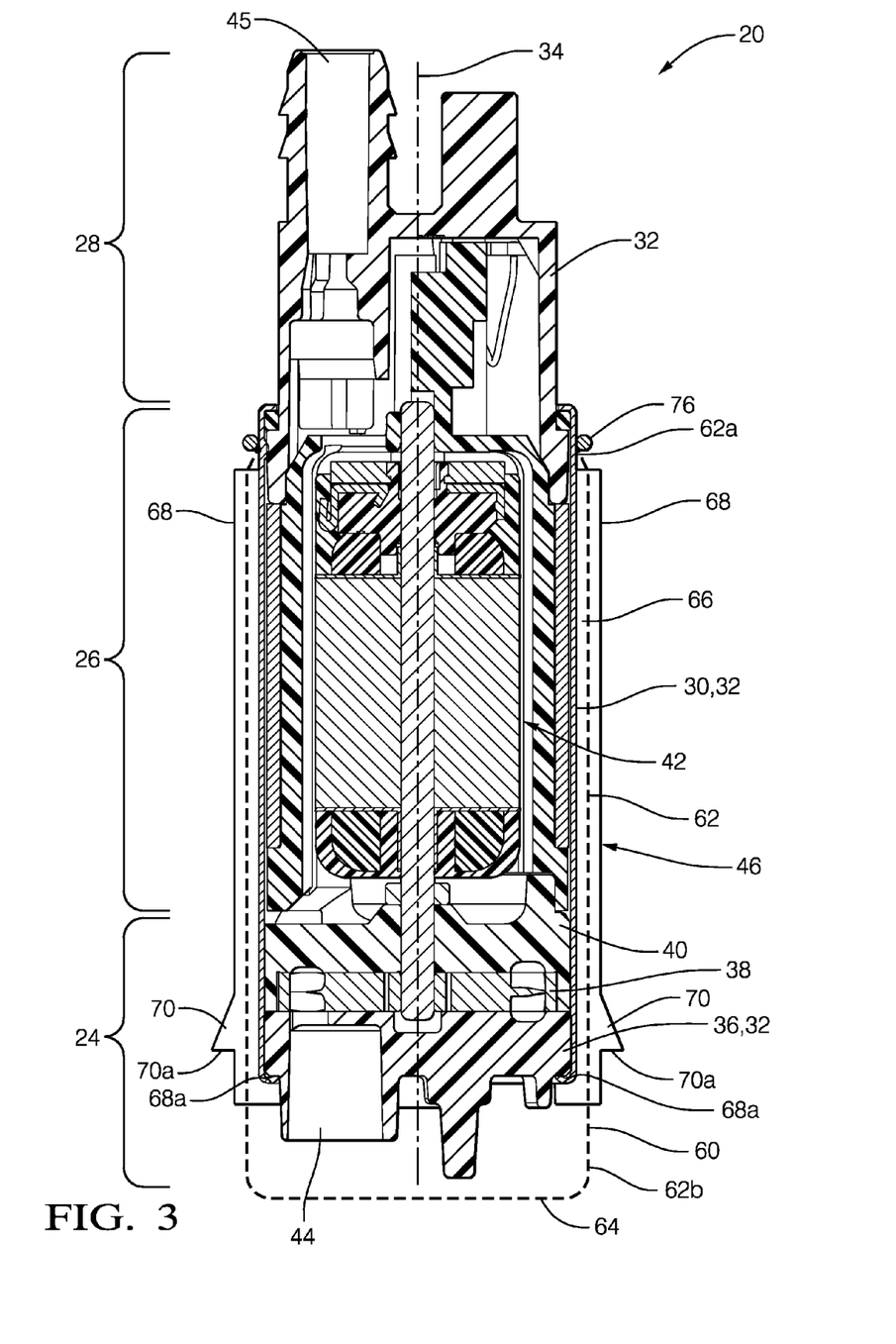
FIG. 3 is an axial cross-sectional view of a fuel pump and strainer in accordance with the present invention.

With continued reference to FIGS. 1 and 2 and now with addition reference slot FIG. 3 which is an axial cross-sectional view of fuel pump 20, fuel pump 20 generally includes a pump section 24 at one end, a motor section 26 adjacent to pump section 24, and an outlet section 28 adjacent to motor section 26 at the end of fuel pump 20 opposite pump section 24. A shell 30 of fuel pump 20 retains pump section 24, motor section 26 and outlet section 28 together. A pump housing 32 extending along an axis 34 is defined by shell 30 and portions pump section 24 and outlet section 28 which enclose pump section 24 and motor section 26 within shell 30. Fuel enters fuel pump 20 at pump section 24, a portion of which is rotated by motor section 26 as will be described in more detail later, and is pumped past motor section 26 to outlet section 28 where the fuel exits fuel pump 20.

Pump section 24 includes an inlet plate 36 which in part defines pump housing 32, a pumping arrangement illustrated as impeller 38, and an outlet plate 40. Inlet plate 36 and outlet plate 40 are held stationary relative to pump housing 32 while impeller 38 is rotated about axis 34 in use by an electric motor 42 that is located within motor section 26. Inlet plate 36 defines an inlet 44 which introduces fuel into pump housing 32 such that when impeller 38 is rotated about axis 34 by electric motor 42, impeller 38 pumps fuel from inlet 44, past electric motor 42, and out of pump housing 32 through an outlet 45 defined by outlet section 28. Pump section 24 and electric motor 42 and their operation are known and will not be discussed further herein. Further details of pump section 24 and electric motor 42 are disclosed in United States Patent Application Publication No. US 2014/0314591 A1 to Herrera, the disclosure of which is incorporated herein by reference in its entirety. Fuel pump 20 includes a strainer 46, as will be described in greater detail later, which prevents foreign matter that may be present in the fuel from being drawing into pump housing 32. While the pumping arrangement has been illustrated as an impeller, it should now be understood that other pumping arrangements may alternatively be used, by way of non-limiting example only, a gerotor, roller vanes, gears, or vanes.

Reservoir assembly 22 generally includes a fluid reservoir illustrated as fuel reservoir 48 and a pump holder 50. Fuel reservoir 48 includes a fuel reservoir sidewall 52 which surrounds axis 34 and which extends axially from a fuel reservoir sidewall first end 52a to a fuel reservoir sidewall second end 52b. Fuel reservoir 48 is oriented within fuel tank 12 such that fuel reservoir sidewall first end 52a is proximal to the top of fuel tank 12, i.e. fuel reservoir sidewall first end 52a faces away from the direction of gravity, and such that fuel reservoir sidewall second end 52b is adjacent to the bottom of fuel tank 12, i.e. fuel reservoir sidewall second end 52b faces toward the direction of gravity. Fuel reservoir 48 also includes a fuel reservoir end wall 54 which traverses the interior of fuel reservoir sidewall 52 at fuel reservoir sidewall second end 52b. Fuel reservoir end wall 54 is offset axially from fuel reservoir sidewall first end 52a sufficiently far to establish a fluid volume, hereinafter referred to as fuel volume 56, within fuel reservoir sidewall 52 axially between fuel reservoir sidewall first end 52a and fuel reservoir end wall 54. Fuel pump 20 is suspended within fuel volume 56 by pump holder 50 which is fixed to fuel reservoir sidewall 52 proximal to fuel reservoir sidewall first end 52a. Pump holder 50 includes opposing pump holder arms 58 which extend axially into fuel volume 56 and support fuel pump 20 as will be described in greater detail later.

Strainer 46 includes a straining medium 60 which may be a woven or non-woven filtering material which may preferably be nylon or stainless steel, and which allows fuel to pass therethrough while preventing foreign matter of a predetermined size that may be present in the fuel from passing therethrough. Straining medium 60 defines a strainer sidewall 62 which extends from a strainer sidewall first end 62a to a strainer sidewall second end 62b such that strainer sidewall 62 and strainer sidewall first end 62a circumferentially surround pump housing 32. Straining medium 60 also defines a strainer end wall 64 which is axially offset from inlet 44 and which closes off strainer sidewall second end 62b. Consequently, straining medium 60 defines a strained volume 66 with pump housing 32 such that strained volume 66 is defined radially between straining medium 60 and pump housing 32 and such that strained volume 66 is in fluid communication with inlet 44. Strained volume 66 is also defined axially between straining medium 60 and the axial end of pump housing 32 that defines inlet 44 such that inlet 44 is in strained volume 66. Strainer sidewall first end 62a is sealed to pump housing 32, by way of non-limiting example only, by being held in circumferential compression against pump housing 32. Compression of strainer sidewall first end 62a to pump housing 32 can be accomplished, by non-limiting example only, with an O-ring, an elastic band, or a cable tie. In this way, fuel must pass through straining medium 60 in order to reach inlet 44.

In order to maintain radial separation between pump housing 32 and straining medium 60, and consequently maintain strained volume 66, a plurality of standoffs may be provided radially between pump housing 32 and straining medium 60. The standoffs may take the form of ribs 68 which extend axially along strainer sidewall 62 such that ribs 68 are circumferentially spaced around strainer sidewall 62. In addition to maintaining radial separation between pump housing 32 and straining medium 60, ribs 68 also provide axial support to strainer sidewall 62. While six ribs 68 are shown, it should be understood that a greater or less number of ribs 68 may be provided. Ribs 68 stop short of strainer sidewall first end 62a to allow strainer sidewall first end 62a to seal with pump housing 32. As shown, ribs 68 extend both radially inward and radially outward from straining medium 60, however, ribs 68 may alternatively extend only radially inward. Ribs 68, may be fixed to straining medium 60, by way of non-limiting example only, by being formed in an overmolding process with straining medium 60 as will be described in greater detail later.

As shown, two ribs 68 may include snap features 70 extending radially outward therefrom which engage complementary retention apertures 72 formed in pump holder arms 58. Snap features 70 are inclined such that snap features 70 define retention shoulders 70a which face toward fuel reservoir end wall 54, i.e. toward the bottom of fuel reservoir 48. When fuel pump 20 together with strainer 46 is inserted into pump holder 50 along axis 34, snap features 70 resiliently flex pump holder arms 58 radially outward until snap features 70 are aligned with respective retention apertures 72, thereby allowing pump holder arms 58 to spring radially inward and apply a radial compressive force to pump housing 32 through ribs 68 which include snap features 70. Retention shoulders 70a prevent fuel pump 20 and strainer 46 from backing out of pump holder 50. The portion of ribs 68 which extend radially inward from straining medium 60 may be stepped in the axial direction, thereby defining a rib shoulder 68a which is substantially perpendicular to axis 34 and which faces toward strainer sidewall first end 62a. Rib shoulders 68a provide a surface upon which pump housing 32 rests. In this way, ribs 68 support fuel pump 20 both axially and radially. Ribs 68 may also be beneficial to isolate vibration of fuel pump 20 from reservoir assembly 22 since ribs 68 provide minimal contact area with fuel pump 20, thereby minimizing vibration transmission.

In order to further maintain radial separation between pump housing 32 and straining medium 60, and consequently maintain strained volume 66, additional standoffs may be provided radially between pump housing 32 and straining medium 60. The additional standoffs may take the form of nodes 74 (only visible in FIG. 4B) which are positioned between adjacent ribs 68. Nodes 74 do not provide support to straining medium 60, and consequently are sized to minimize flow resistance within strained volume 66. As shown, four nodes 74 are provided between each adjacent pair of ribs 68, thereby resulting in a total of twenty-four nodes 74, it should be understood that a lesser or greater number of nodes 74 may be provided. As shown, nodes 74 extend only radially inward from straining medium 60, however, nodes 74 may alternatively extend both radially inward and radially outward. Nodes 74, may be fixed to straining medium 60, by way of non-limiting example only, by being formed in an overmolding process with straining medium 60 as will be described in greater detail later.

Figure 4A:
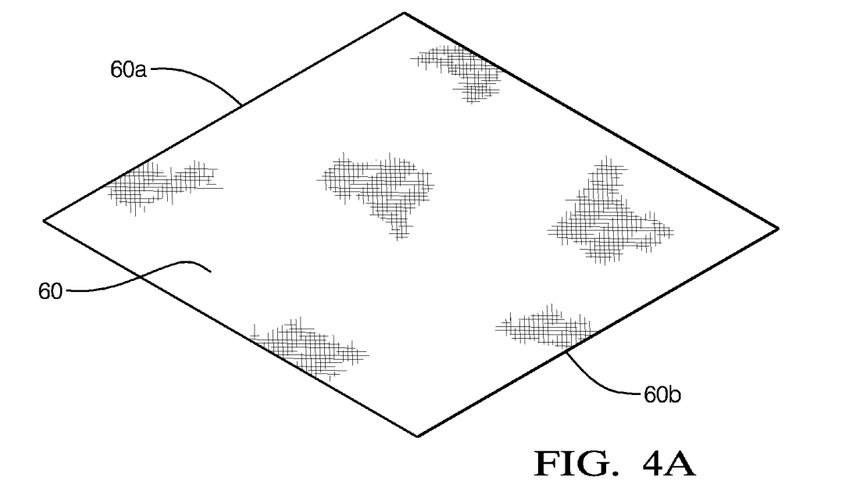
FIGS. 4A-4F are a progression of views showing a method of forming the strainer in accordance with the present invention and assembling the fuel strainer to the fuel pump.
Figure 4B:
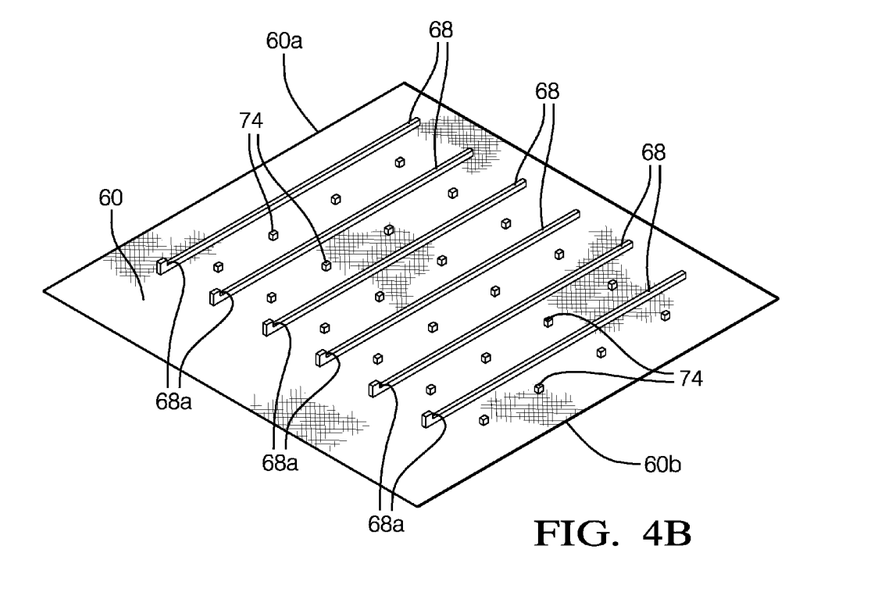
Figure 4C:
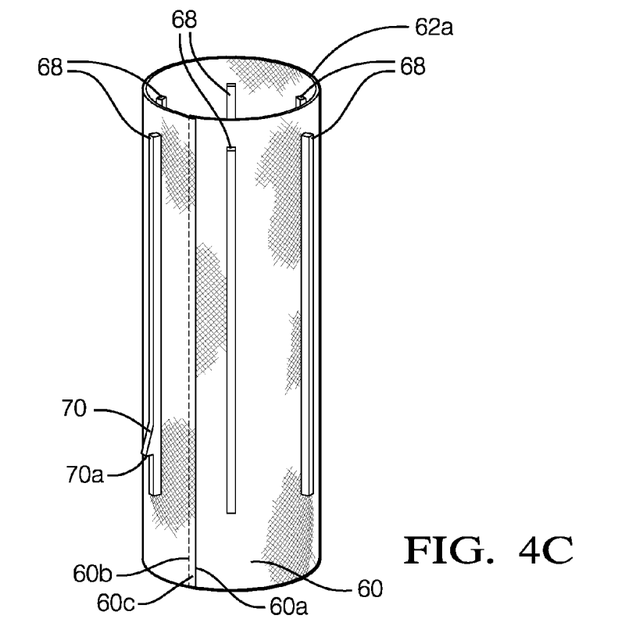
Figure 4D:
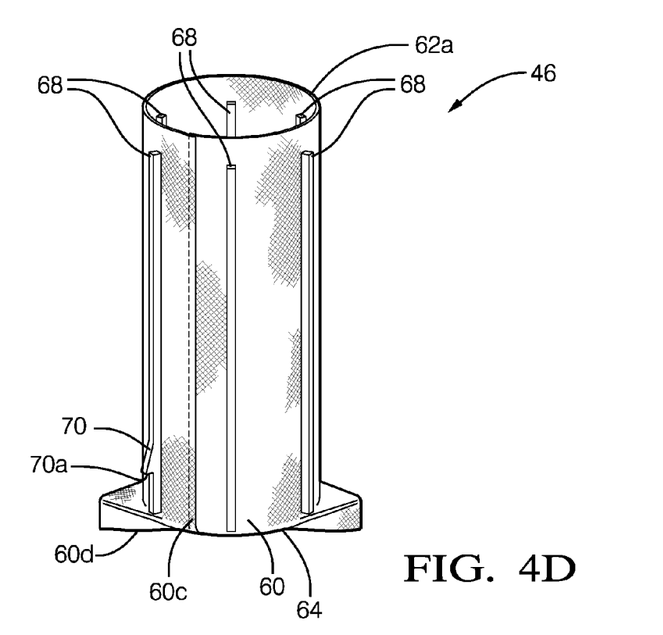
Figure 4E:
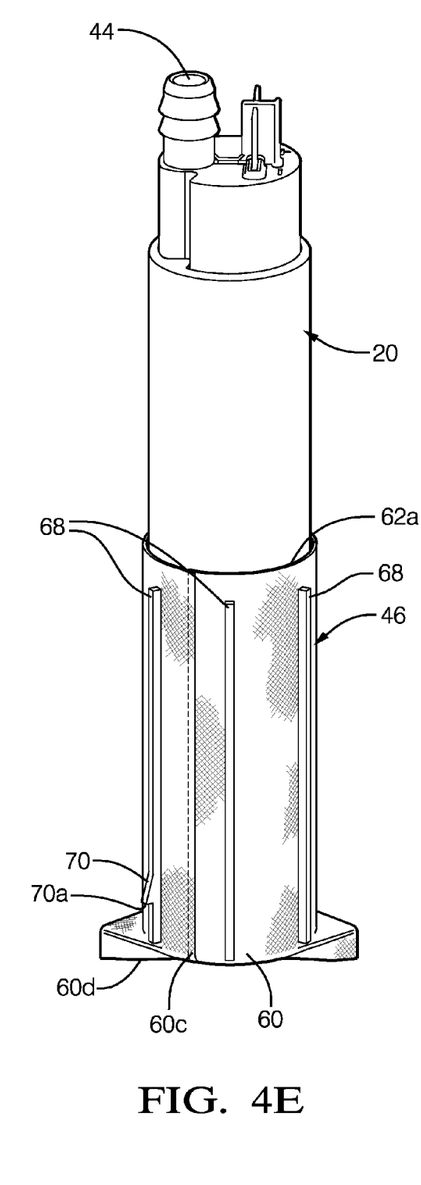
Figure 4F:
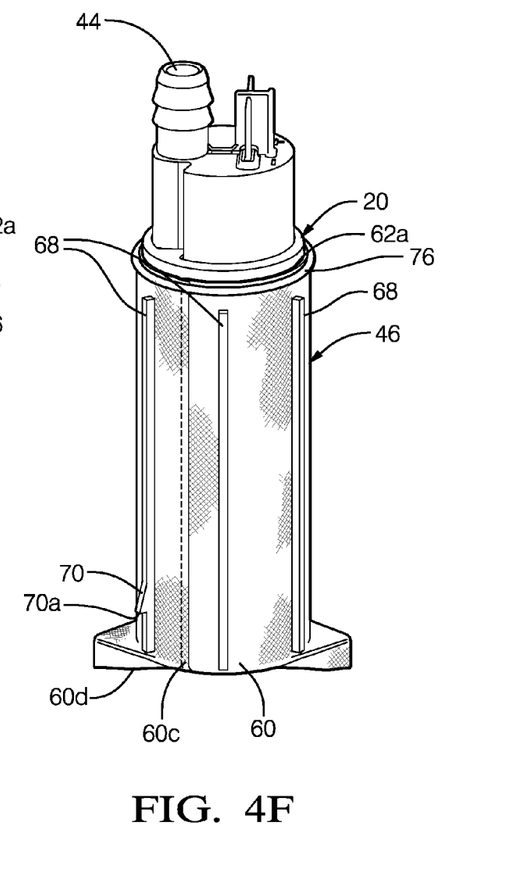

With continued reference to FIGS. 2 and 3 and now with additional reference to FIGS. 4A-4F, a method will now be described to form strainer 46. In a first step as shown in 4A, straining medium 60 is provided in sheet form such that straining medium 60 is substantially planar and free of ribs 68 and nodes 74 and extends laterally from a straining medium first edge 60a to a straining medium second edge 60b. Next, as shown in FIG. 4B, ribs 68 and nodes 74 are formed and fixed to straining medium 60, by way of non-limiting example only, in an injection molding operation where straining medium 60 is positioned within a mold cavity (not show) having recesses in the shape of ribs 68 and nodes 74 into which liquid plastic is injected. In this way, ribs 68 and nodes 74 are simultaneously formed and bonded to straining medium 60. After ribs 68 and nodes 74 are formed, straining medium 60 is formed into a cylinder as shown in FIG. 4C by overlapping straining medium first edge 60a and straining medium second edge 60b. The overlapping portions of straining medium first edge 60a and straining medium second edge 60b are fixed and sealed together, by way of non-limiting example only, by welding or plastic overmolding, thereby forming a first straining medium seam 60c axially along straining medium 60. While not shown, straining medium 60 may be wrapped around a cylindrical mandrel in order to form straining medium 60 into a cylinder. Next, as shown in FIG. 4D strainer end wall 64 is formed by pinching one end of the cylinder of straining medium 60 closed to form a second straining medium seam 60d which is fixed and sealed, by way of non-limiting example only, by welding or plastic overmolding. Second straining medium seam 60d is substantially perpendicular to axis 34. Following formation of strainer end wall 64, fuel pump 20 is inserted into the interior of the cylindrical form of straining medium 60 as shown in FIG. 4E After fuel pump 20 is fully inserted into straining medium 60 as shown in FIG. 4F, strainer sidewall first end 62a is held in circumferential compression around pump housing 32, for example by placing and tightening a retention band 76 circumferentially around strainer sidewall first end 62a, thereby sealing strainer sidewall first end 62a to pump housing 32.

Figure 5:
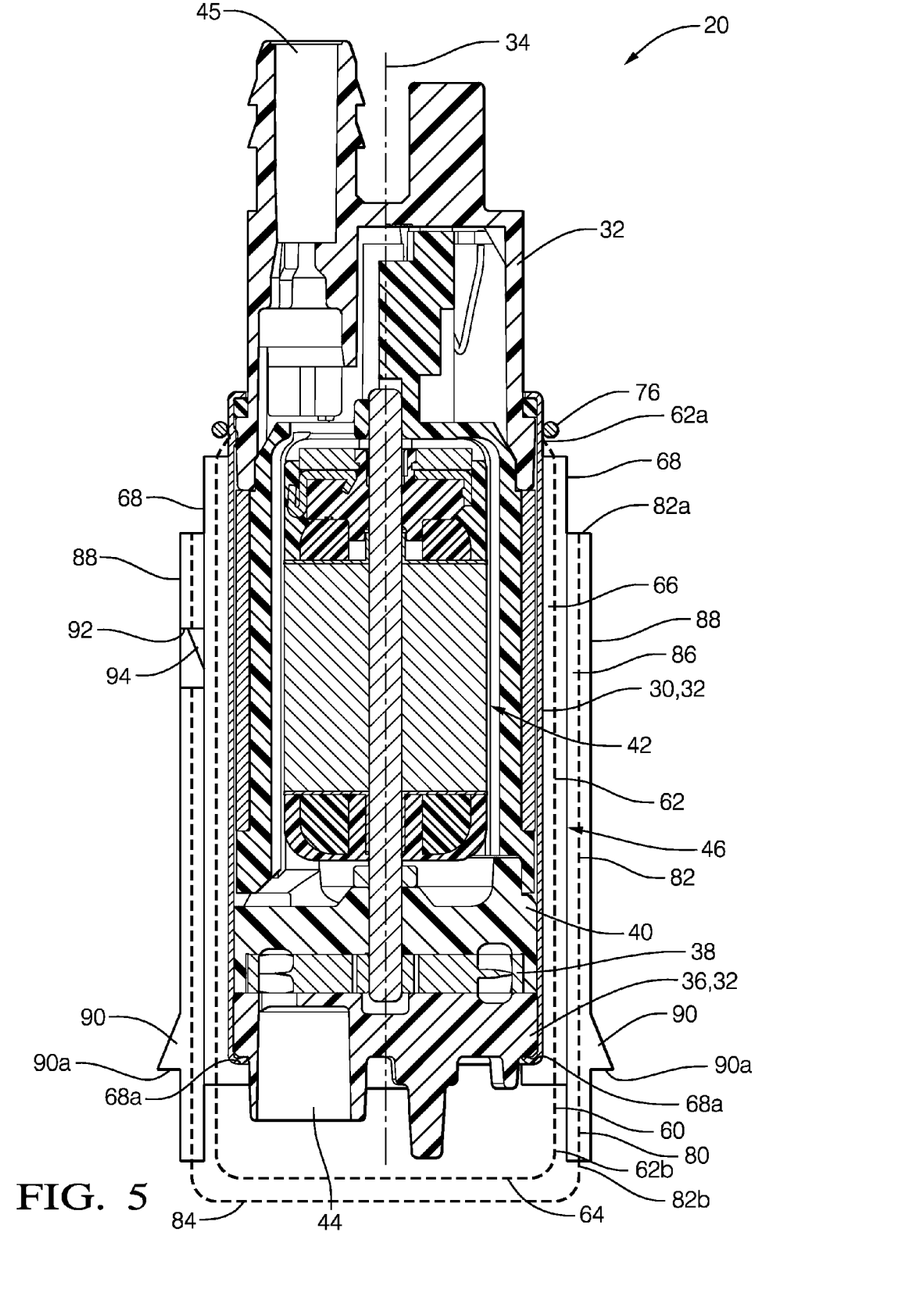
FIG. 5 is the axial cross-sectional view of FIG. 3 shown with an optional outer straining medium.

Now with reference to FIG. 5, strainer 46 may include an optional outer straining medium 80, which may be particularly useful when the fuel being pumped is diesel fuel which is subject to gelling or crystallizing at low temperatures. Outer straining medium 80 may be a woven or non-woven filtering material which may preferably be nylon or stainless steel, and which allows fuel to pass therethrough while preventing foreign matter of a predetermined size that may be present in the fuel from passing therethrough. Outer straining medium 80 is similar to straining medium 60, however, outer straining medium 80 is configured to prevent foreign matter that is smaller in size from passing therethrough compared to straining medium 60, i.e. straining medium 60 is coarser than outer straining medium 80. Outer straining medium 80 defines an outer strainer sidewall 82 which extends from an outer strainer sidewall first end 82a to an outer strainer sidewall second end 82b such that outer strainer sidewall first end 82a circumferentially surrounds strainer sidewall 62. Outer straining medium 80 also defines an outer strainer end wall 84 which is axially offset from strainer end wall 64 and which closes off outer strainer sidewall second end 82b. Consequently, outer straining medium 80 defines an outer strained volume 86 with straining medium 60 such that outer strained volume 86 is defined radially between outer straining medium 80 and straining medium 60. Outer strained volume 86 is also defined axially between outer straining medium 80 and straining medium 60.

The portions of ribs 68 which extend radially outward from straining medium 60 may be used to maintain radial separation between straining medium 60 and outer straining medium 80, and consequently maintain outer strained volume 86. In addition to, or in the alternative, a plurality of standoffs may be fixed to outer straining medium 80 radially between straining medium 60 and outer straining medium 80. The standoffs may take the form of outer ribs 88 which extend axially along outer strainer sidewall 82 such that outer ribs 88 are circumferentially spaced around outer strainer sidewall 82. In addition to maintaining radial separation between straining medium 60 and outer straining medium 80, outer ribs 88 also provide axial support to outer strainer sidewall 82. As shown, the number of outer ribs 88 may be equal in number to ribs 68 and outer ribs 88 and ribs 68 may include complementary interlocking features which allow outer ribs 88 to be locked to ribs 68. Outer ribs 88, may be fixed to outer straining medium 80, in the same method as described previously relative to ribs 68. While not shown, nodes similar to nodes 74 of straining medium 60 may be provided radially between straining medium 60 and outer straining medium 80 and may be fixed to either straining medium 60 or outer straining medium 80.

Since outer straining medium 80 covers ribs 68, snap features 70 may be omitted from ribs 68. Consequently, two outer ribs 88 may include outer snap features 90 extending radially outward therefrom which engage retention apertures 72 formed in pump holder arms 58. Outer snap features 90 are inclined such that outer snap features 90 define outer retention shoulders 90a which face toward fuel reservoir end wall 54, i.e. toward the bottom of fuel reservoir 48. When fuel pump 20 together with strainer 46 is inserted into pump holder 50 along axis 34, outer snap features 90 resiliently flex pump holder arms 58 radially outward until outer snap features 90 are aligned with respective retention apertures 72, thereby allowing pump holder arms 58 to spring radially inward and apply a compressive force to pump housing 32 through outer ribs 88 which include outer snap features 90. Outer retention shoulders 90a prevent fuel pump 20 and strainer 46 from backing out of pump holder 50.

In the event of gelling or crystallizing of the fuel which prevents the fuel from flowing through outer straining medium 80, a bypass path must be provided which allows the fuel to bypass outer straining medium 80, thereby allowing the fuel to be strained only by straining medium 60. Consequently, a means for bypassing outer straining medium 80 is provided which allows the fuel to bypass outer straining medium 80, i.e. fuel can enter outer strained volume 86 without being strained by outer straining medium 80. In a simple form, the bypass means may be made by configuring outer straining medium 80 to be shorter than straining medium 60, i.e. outer straining medium 80 extends axially a lesser extent that straining medium 60 and a portion of straining medium 60 is not circumferentially surrounded by outer straining medium 80. In this way, a portion of strainer sidewall 62 is not circumferentially surrounded by outer strainer sidewall 82. While this arrangement results in some fuel always being able to bypass outer straining medium 80, this occurs at a relatively high level within fuel reservoir 48. Since the foreign matter is relatively heavy, it tends to remain low in fuel reservoir 48, and consequently the foreign matter has a low tendency to bypass outer straining medium 80. In addition to, or in the alternative, the bypass means may include a bypass aperture 92 which is formed in outer straining medium 80 radially through outer strainer sidewall 82. Bypass aperture 92 may include a bypass door 94 which is hinged and configured to open when a pressure differential exists between the inside and the outside of the outer straining medium 80. Consequently, if outer straining medium 80 become sufficiently clogged and unable to flow fuel at a sufficient rate to keep up with the demand of fuel pump 20, bypass door 94 will open to allow fuel to bypass outer straining medium 80. Alternatively, bypass door 94 may be omitted, simply leaving bypass aperture 92 open at all times. While bypass aperture 92 without bypass door 94 results in some fuel always being able to bypass outer straining medium 80, bypass aperture 92 is located sufficiently high in fuel reservoir 48 such that the foreign matter tends to stay below bypass aperture 92, resulting in a low tendency of the foreign matter to bypass outer straining medium 80 through.

Strainer 46 provides a compact arrangement with fuel pump 20 while providing a large filtering area that is simple and economical to produce. Furthermore, by defining strained volume 66 with pump housing 32, heat generated by the operation of fuel pump 20 can improve cold temperature operation, for example when diesel fuel is the fuel being pumped which is subject to gelling or crystallizing at low temperatures.

While this invention has been described in terms of preferred embodiments thereof, it is not intended to be so limited, but rather only to the extent set forth in the claims that follow.

I claim:

1. A fluid delivery module comprising:
   a fluid pump extending along an axis, said fluid pump comprising:
      a pump housing;
      an inlet which introduces fluid into said pump housing;
      an outlet which discharges said fluid from said pump housing;
      a pump section which pumps said fluid from said inlet to said outlet; and
   a strainer through which said fluid passes in order to enter said inlet, said strainer comprising:
      a straining medium configured to allow said fluid to pass therethrough while preventing foreign matter of a predetermined size from passing therethrough,
      said straining medium defining a strained volume with said pump housing,
      said strained volume being defined radially between said straining medium and said pump housing such that said strained volume is in fluid communication with said inlet;
      a strainer sidewall made by said straining medium which extends from a strainer sidewall first end to a strainer sidewall second end such that said strainer sidewall and said strainer sidewall first end circumferentially surround said pump housing; and
      a strainer end wall made by said straining medium which closes off said strainer sidewall second end.

2. A fluid delivery module as in claim 1 wherein said strainer sidewall first end is sealed to said pump housing.

3. A fluid delivery module as in claim 1 wherein said strainer further comprises a plurality of standoffs located radially between said straining medium and said pump housing which maintain radial separation between said pump housing and said straining medium.

4. A fluid delivery module as in claim 3 wherein each of said plurality of standoffs are affixed to said straining medium.

5. A fluid delivery module as in claim 3 wherein said plurality of standoffs comprises a plurality of ribs which extend axially along said strainer sidewall such that said plurality of ribs are circumferentially spaced and provide axial support to said strainer sidewall.

6. A fluid delivery module as in claim 5 wherein at least one of said plurality of ribs is stepped axially, thereby defining a rib shoulder which axially supports said pump housing.

7. A fluid delivery module as in claim 5 wherein said plurality of standoffs further comprises a plurality of nodes which are located between adjacent ones of said plurality of ribs.

8. A fluid delivery module as in claim 5 further comprising:
   a fluid reservoir defining a fluid volume; and
   a pump holder fixed to said fluid reservoir such that said pump holder suspends said fluid pump within said fluid volume.

9. A fluid delivery module as in claim 8 wherein at least one of said plurality of ribs includes a snap feature extending radially outward therefrom which engages a retention aperture of said pump holder, thereby retaining said strainer to said pump holder.

10. A fluid delivery module as in claim 1 wherein said inlet is in said strained volume.

11. A fluid delivery module as in claim 1 wherein said strainer further comprises:
    an outer straining medium circumferentially surrounding straining medium, said outer straining medium being configured to allow said fluid to pass therethrough while preventing foreign matter of a second predetermined size from passing therethrough, said outer straining medium defining an outer strained volume with said pump housing, said outer strained volume being defined radially between said outer straining medium and said straining medium.

12. A fluid delivery module as in claim 11 wherein said second predetermined size is smaller than said predetermined size.

13. A fluid delivery module as in claim 11 wherein said strainer further comprises a plurality of standoffs located radially between said straining medium and said outer straining medium which maintain radial separation between said straining medium and said outer straining medium.

14. A fluid delivery module as in claim 13 wherein said plurality of standoffs comprises a plurality of ribs which extend axially between said straining medium and said outer straining medium.

15. A fluid delivery module as in claim 11 further comprising a means for bypassing said outer straining medium, thereby allowing said fluid to enter said outer strained volume without being strained by said outer straining medium.

16. A fluid delivery module as in claim 15 wherein said means for bypassing said outer straining medium comprises a portion of said straining medium which is not circumferentially surrounded by said outer straining medium.

17. A fluid delivery module as in claim 15 wherein said means for bypassing said outer straining medium comprises a bypass aperture which extends radially through said outer straining medium.

18. A fluid delivery module as in claim 17 wherein said means for bypassing said outer straining medium further comprises a bypass door which opens and closes based on differential pressure between said outer strained volume and a volume surrounding said outer straining medium.

* * * * *